J. P. G. ELKIN.
RECEPTACLE.
APPLICATION FILED SEPT. 17, 1909.
978,569.
Patented Dec. 13, 1910.
5 SHEETS—SHEET 1.
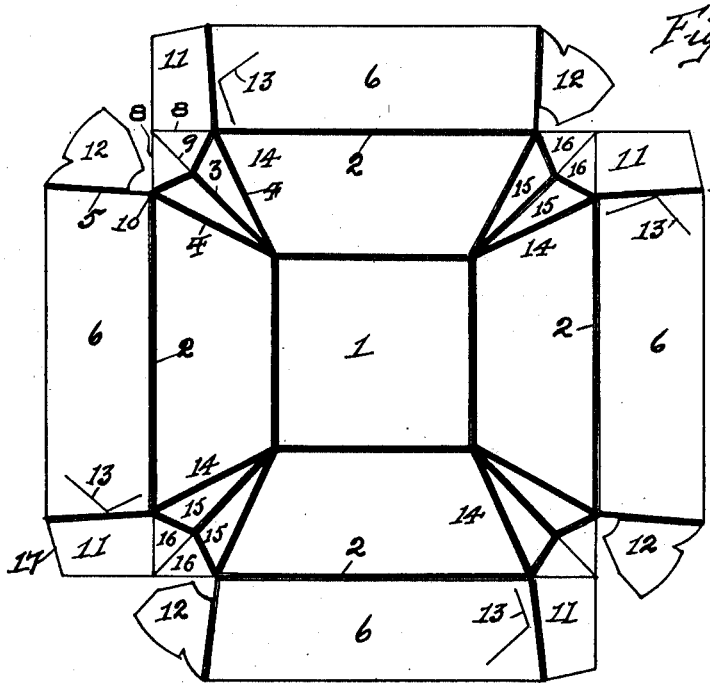
WITNESSES:
INVENTOR
Jo. P. G. Elkin
BY
Harry Lea Dodson
his ATTORNEY

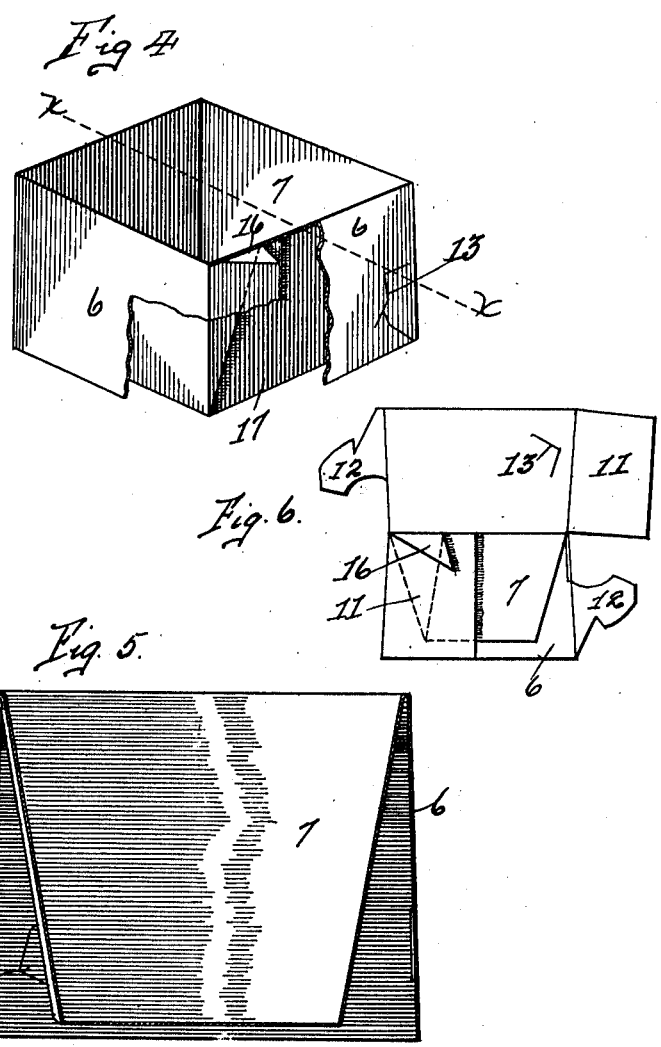

J. P. G. ELKIN.
RECEPTACLE.
APPLICATION FILED SEPT. 17, 1909.

978,569.

Patented Dec. 13, 1910.
5 SHEETS—SHEET 3.

WITNESSES:

INVENTOR

BY

ATTORNEY

J. P. G. ELKIN.
RECEPTACLE.
APPLICATION FILED SEPT. 17, 1909.
978,569.
Patented Dec. 13, 1910.
5 SHEETS—SHEET 4.
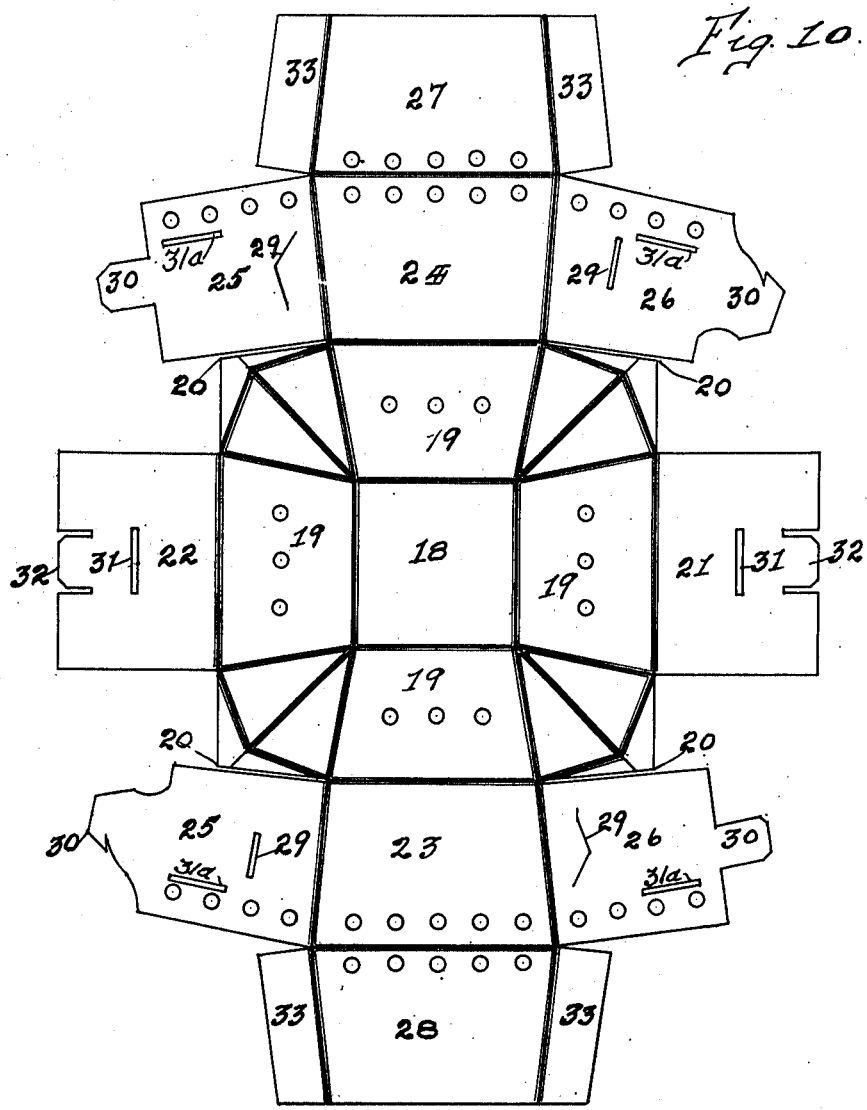

J. P. G. ELKIN.
RECEPTACLE.
APPLICATION FILED SEPT. 17, 1909.
978,569.
Patented Dec. 13, 1910.
5 SHEETS—SHEET 5.
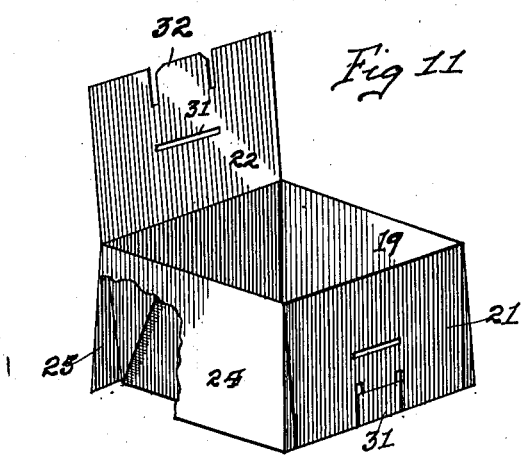
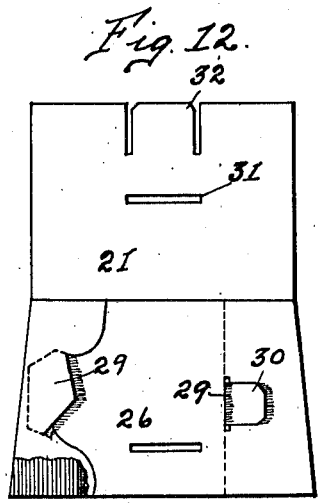
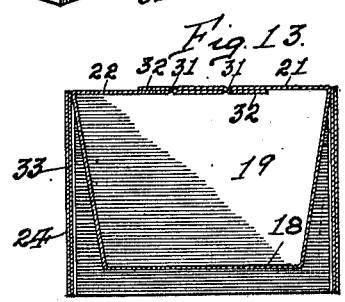
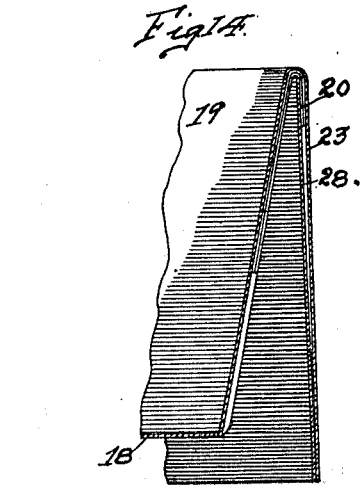
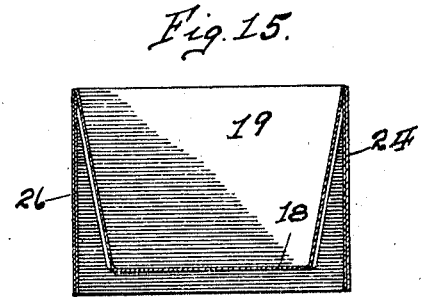
WITNESSES:
INVENTOR
BY
ATTORNEY

UNITED STATES PATENT OFFICE.

JO P. G. ELKIN, OF MAPLEWOOD, MISSOURI.

RECEPTACLE.

978,569.   Specification of Letters Patent.   Patented Dec. 13, 1910.

Application filed September 17, 1909. Serial No. 518,274.

*To all whom it may concern:*

Be it known that I, Jo P. G. ELKIN, a citizen of the United States, residing at Maplewood, in the county of St. Louis and State of Missouri, have invented a certain new and useful Receptacle, of which the following is a specification.

My invention relates to the class of devices designed for the use of picnic luncheons to hold icecream or other similar articles, though it may be used for berry boxes or any package in which it is desirable to secure lightness and cheapness of construction.

The principal object of my device is to provide a dish which will not tip over in use. It is a very common experience at picnics where icecream is served hurriedly that if it is put to one side of the plate or saucer that the same will tip over and the icecream, as a consequence, be lost. This is absolutely impossible where my improved receptacle is used.

My invention has for its further object to provide a space on the sides of the dish or box which may be used for advertising purposes, the construction being such as to permit of this without materially adding to the expense.

My manner of accomplishing the foregoing may be more readily understood by having reference to the accompanying drawings which are a part of this specification and are hereunto annexed, in which—

Figure 7:
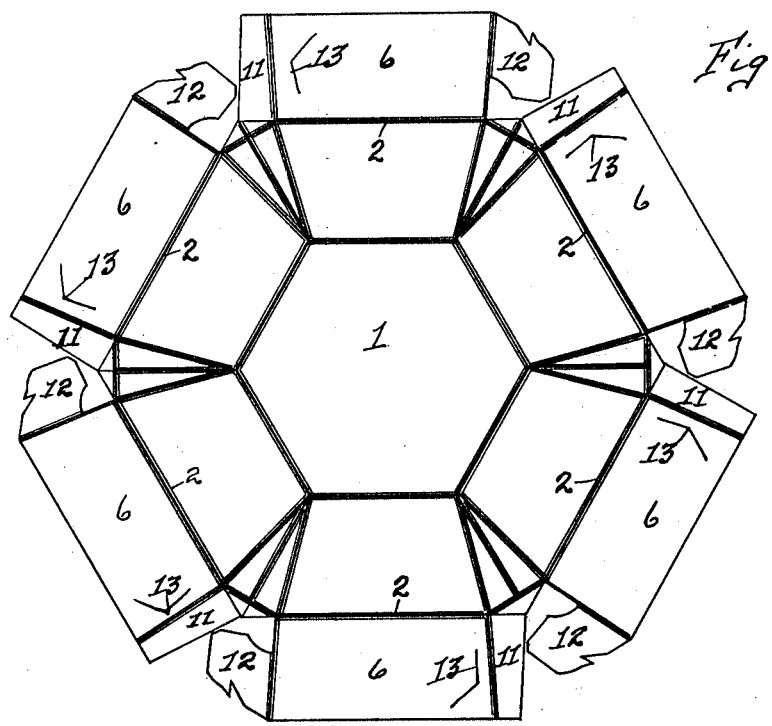
Figure 8:
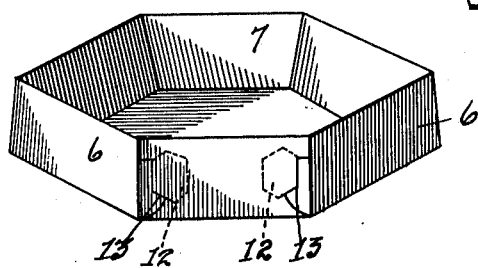
Figure 9:
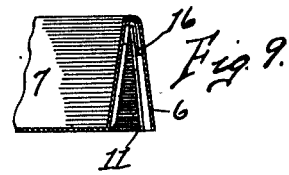

Figure 1 is a perspective view of my improved icecream dish, having part of the outside broken away to show the method of locking the corner fold in position. Fig. 2 is a cross section of the same taken on a point just in advance of the said lock. Fig. 3 is a plan view of a blank of cardboard or other suitable material cut and scored to be folded into shape to form my improved dish. Fig. 4 is a perspective view of my invention where it is made into a receptacle to contain berries. Fig. 5 is a sectional view of the same taken on line x—x in Fig. 4. Fig. 6 is a detail showing the method of locking the corner fold in position. Fig. 7 is a plan view of a blank of cardboard or other suitable material cut and scored to be folded into a hexagonal dish. Fig. 8 is a perspective view showing the said sheet folded into shape, showing two slots and locks on one of the sides. Fig. 9 is a detail sectional view showing the corner lock. Fig. 10 shows a plan view of a blank cut from suitable material to construct my improved berry box which forms a complete package and does not need wrapping. Fig. 11 is a perspective view of the said box showing one of the covers raised. Fig. 12 is an elevation showing a method of locking the sides in position. Fig. 13 is a cross sectional view showing the covers closed and locked in position. Fig. 14 is a cross sectional view showing the method of locking the corner folds in position. Fig. 15 is a cross sectional view taken at a point just in advance of the side folds.

The same reference figures refer to similar parts throughout the entire description.

In constructing my improved receptacle a sheet of the desired material is cut into the shape shown in Fig. 3. This blank is creased to form the square 1. Lines 2, forming a square, are then drawn at a distance from the square 1 depending on the depth of the dish desired. In describing the manner of forming the corners only one corner will be described, as it is obvious that the same method may be followed on all of the corners. Line 3 is a portion of the diagonal joining the corresponding corners 1 and 2 and lines 4 are placed equally distant from line 3. The position of lines 4 determine the bulge or flare of the sides 2 of the dish; placing the said lines 4 nearer to the line 3 increases the flare or bulge, while removing them from the line 4 will make the sides 2 less flaring. Lines 5 are projecting from a point at the intersection of the lines 4 with the sides 2. The outside of the dish is formed by wings 6. These wings are arranged to flare, as better shown in the sectional views so that the central portion 7 is supported by their edge. This accomplishes the double purpose of preventing the dish or box from tipping over, and also permits the telescoping of them for packing, so that a considerable number can be packed in a small space. Cuts 8 and 9 extend from the outer ends of lines 3 and 4 until they meet each other. The flare of the sides of the dish is determined by the angularity of the lines 4 and 5 and the variation of the angle of these lines will increase or decrease the flare of both the inner and outer walls of the dish. These sides 6 have extended lips or wings 11 and 12, the wings 12 being inserted in the slots 13 to lock the sides in position. The wings 11 are used to secure the folds made by folding the blank at the corners upon the lines 3 and 4, thus forming a bellows fold which is bent at right angles to the side 14, the wing 11 being then folded over the corner fold 15, and the extension 16 is then folded down overlapping the wing 11. This in turn is held in position by means of the side 6 and serves to lock the corner of the box securely in position at any and all times.

It is a frequent occurrence where icecream is used in a dish constructed by folding a piece of cardboard or other desired material, that the melted cream will work its way around and into the folded corner and pull the corner down and destroy the box or dish. This, it is obvious, will be impossible where my improved lock is used; even though the liquid did work around into the corner folds, it would still be impossible to pull the corners down without tearing off the projection 16, which is practically impossible.

The wings 11 are cut away on line 17, so that when folded in position they will correspond with the edge of the box or dish.

Where a berry box is desired as shown in Fig. 4, it is generally desirable to have the central portion 7 elevated from the bottom of the outer sides. This provides for a circulation on all sides of the berries and keeps them in a much better condition, the sides 6 serving to support the central portion 7, which may be of any desired depth. This is a very desirable feature in a berry box.

The modified construction shown in Figs. 7, 8 and 9 is where a more ornamental style of dish is desired. The form of locking the corners and supporting them can be readily seen by following the description of the square dish or box, and it is thought that the drawing is in itself sufficiently clear to afford adequate disclosure of this form of dish, and that a person skilled in the art will be able to construct a dish of this style from the description and drawings.

In Figs. 10 to 15, inclusive, I have illustrated my improved berry box which is so constructed as not to need any wrapping paper or twine. This box is extremely convenient, as well as saving the expense of wrapping and tying up the berries, as all that is necessary for the merchant to do is to close the box, as illustrated in Fig. 13. It might be shipped closed, although it is preferable to leave it open to permit a free circulation of air through the berries.

Fig. 10 is a plan of a blank of the desired material cut and creased ready to be folded in proper manner for this style of construction. The corner folds are locked differently than in the construction shown in Fig. 4 and the plan view in Fig. 3. In Fig. 10 the blank is creased with an inner square 18 and four side walls 19, the width of these sides being determined by the desired depth of the box. The corners 20 of this square are cut as shown to provide for a uniform flare at the outer sides and cause said sides to conform to the top of the box. Two sides of the box 19 are formed with wings or extensions 21 and 22, which provide a covering for the box when it is completely folded, as better shown in the detail views, Figs. 11, 12 and 13. The other two sides 19 are formed with extensions 23 and 24. These extensions form the sides of the box as shown in the detail views, and are provided with wings 25 and 26, which are provided with suitable slots 29 and locks 30 and form the other two sides of the box. Wings 27 and 28 constitute the lock for the corners, and in this case the lock is formed by folding the extensions 27 and 28 upon the extension 23, as better seen in the detail view, Fig. 14, where the wing 28 extends up on the inside of the extension 23 and engages the corner folds 20 when they are folded over the extensions 27 and 28 as shown in Fig. 14.

Slots 31 are provided to secure the tongues 32 of the covers when the box is closed. It may be found desirable, in some instances to provide slots 31ª in the wings 25 and 26 to hold the covers open, which would be accomplished by inserting the tongues 32 in the said slots.

The extensions 27 and 28 are provided with side wings 33, which fold around the corners of the box and provide added strength to the supporting sides 23, 24, 25 and 26, thus making a package which is amply strong to hold and support without crushing any material, which may be desirable to be placed therein. When the box is folded and closed, as shown in Fig. 13, it is obvious that there is no necessity for wrapping paper and twine but it can be delivered just as it is by the merchant without any additional labor thereon, thus effecting a very considerable saving both in time and material.

Having described my invention, what I regard as new and desire to secure by Letters Patent is, 1. A blank cut and creased to form a box having a bottom and top, and inner and outer side and end walls, the top being formed from extensions of the inner side walls, tongues being formed on certain of said extensions to engage slots cut in other of said extensions, the outer end and side walls being formed from extensions of the inner end walls, certain of said last-named extensions having locks to engage slots in other of said last-named extensions.

2. A blank cut and creased to form a box having a bottom and top, inner and outer side and end walls and corner folds between the inner side and end walls, the top being formed from extensions of the inner side walls, tongues being formed on certain of said extensions to engage slots cut in other of said extensions, the outer end and side walls being formed from extensions of the inner end walls, certain of said last-named extensions having locks to engage slots in other of said last-named extensions, and the corner folds having extensions which may be turned over and engaged between the extensions of the inner end walls which form the outer side walls.

3. In a dish cut and scored from a blank of suitable material, the combination with bottom, flaring inner and outer sides, of corners having radiating creases therein adapted to be alternately folded in and out, said corners having an extension at their outer end and being folded upon themselves, wings or extensions on the sides adapted to engage the folded extensions of the corners, thus locking the folded corners in position, for the purpose set forth substantially as described.

JO P. G. ELKIN.

Witnesses:
C. M. BURMAN,
H. L. COWAN.